Jan. 6, 1953      A. E. DENTLER      2,624,567
FRICTION SHOCK ABSORBING MECHANISM FOR RAILWAY CARS
Filed Aug. 5, 1950      2 SHEETS—SHEET 1
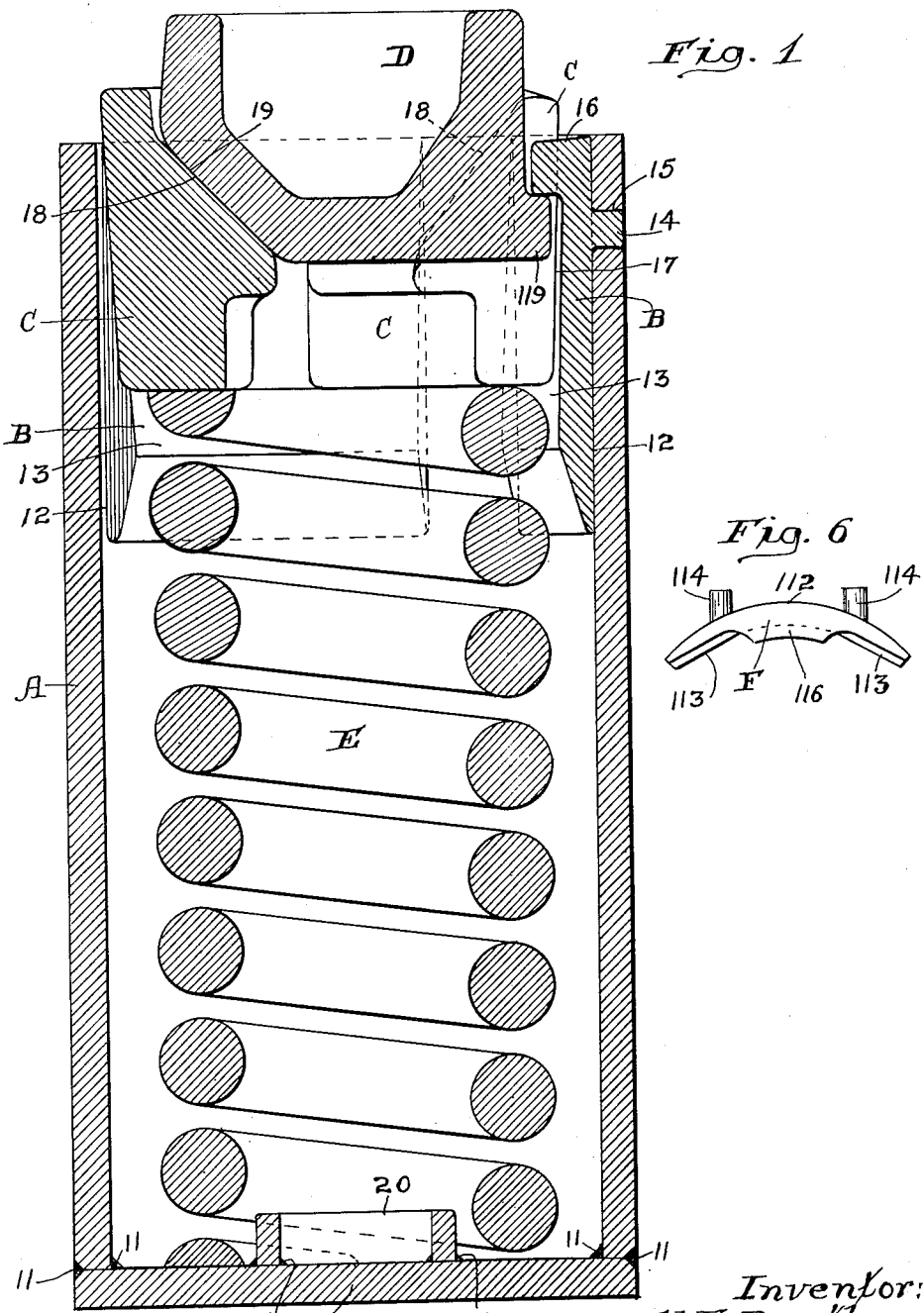
Inventor:
Arnold E. Dentler.
By Henry Fuchs
Atty.

Jan. 6, 1953        A. E. DENTLER        2,624,567
FRICTION SHOCK ABSORBING MECHANISM FOR RAILWAY CARS
Filed Aug. 5, 1950        2 SHEETS—SHEET 2
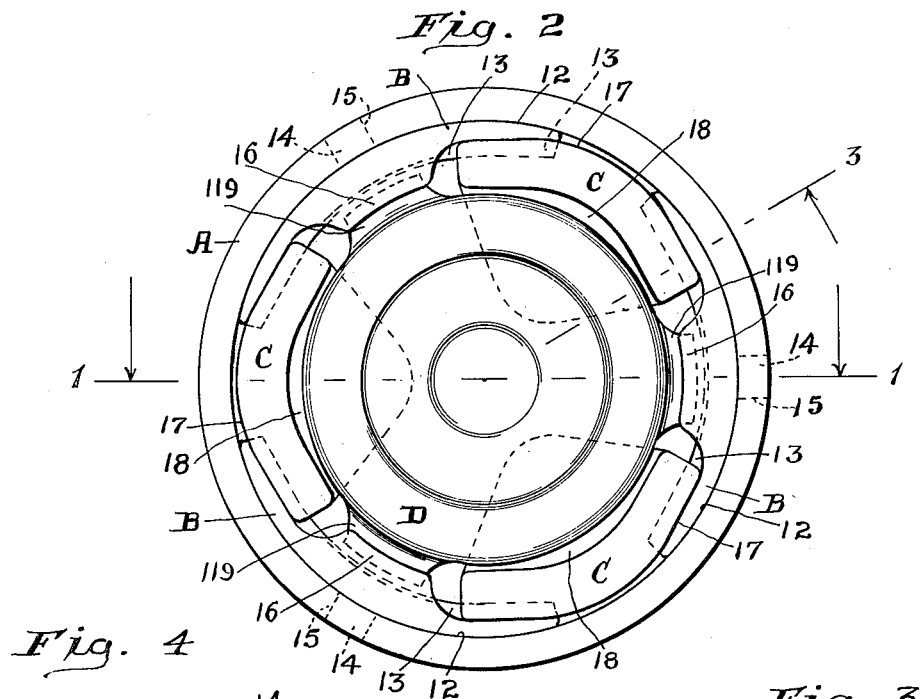
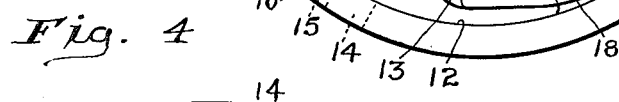
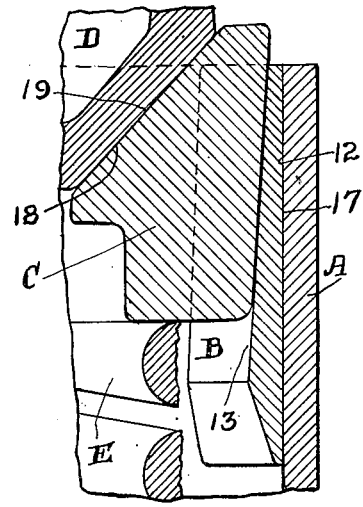
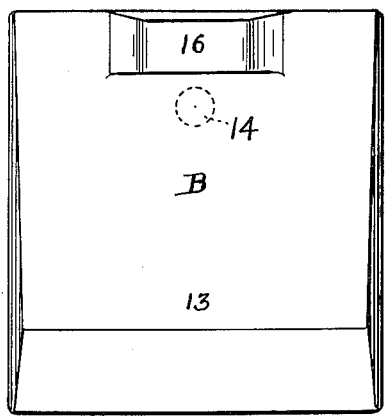
Inventor:
Arnold E. Dentler.
By Henry Fuchs
Atty.

Patented Jan. 6, 1953

2,624,567

UNITED STATES PATENT OFFICE 2,624,567

FRICTION SHOCK ABSORBING MECHANISM FOR RAILWAY CARS

Arnold E. Dentler, La Grange, Ill., assignor to W. H. Miner, Inc., Chicago, Ill., a corporation of Delaware Application August 5, 1950, Serial No. 177,800

2 Claims. (Cl. 267—9)

This invention relates to improvements in friction shock absorbing mechanisms especially adapted for use in connection with railway cars.

One object of the invention is to provide a friction shock absorbing mechanism, comprising a friction casing and a friction clutch slidingly telescoped within the casing, which is designed to be manufactured at low cost.

A more specific object of the invention is to provide a friction shock absorbing mechanism, comprsing a friction casing, and a friction clutch slidingly telescoped within the casing, wherein the casing is provided with separate inserts or liners which provide friction surfaces for the shoes, whereby the casing may be made of low cost fabricated tubing or pipe cut to the proper length, to which the liners, which may be in the form of forgings or castings, are applied, thereby providing friction surfaces on the casing which are durable and wear resistant.

Other objects of the invention will more clearly appear from the description and claims hereinafter following.

In the accompanying drawings forming a part of this specification, Figure 1 is a transverse, vertical sectional view of my improved friction shock absorber, said view corresponding substantially to the line 1—1 of Figure 2. Figure 2 is a top plan view of Figure 1. Figure 3 is a broken sectional view, corresponding substantially to the line 3—3 of Figure 2. Figure 4 is a top plan view of one of the friction liners shown in Figure 2. Figure 5 is a bottom elevational view of Figure 4. Figure 6 is a view similar to Figure 4, showing a modified form of liner.

My improved shock absorber, as illustrated in the drawings, comprises broadly a friction casing A, a set of three liners B—B—B, a set of three friction shoes C—C—C, a wedge D, and a spring E.

The friction casing A comprises a tubular member of circular cross section, open at its top end and closed by a transverse wall 10 at its bottom end. The tubular portion of the casing A is preferably made from fabricated pipe or tubing cut to the proper length. The bottom wall 10 is in the form of a circular plate welded to the bottom end of the tubular member, as indicated at 11.

The liners B—B—B are in the form of relatively thick plates. The plate forming each liner B is transversely curved on its outer side, thus presenting a rounded surface 12 fitting the interior of the casing. The inner side of each liner B presents a pair of laterally outwardly diverging flat surfaces 13—13. The three liners B—B—B are arranged symmetrically around the central longitudinal axis of the casing, with their rounded outer surfaces 12—12—12 abutting the inner side of the tubular wall of said casing. Each liner B is anchored to the casing A by a laterally outwardly projecting pin or lug 14 on the outer side thereof, seated in an opening 15 provided in the casing wall. At its outer end, on the inner side thereof, each liner is provided with a centrally disposed, laterally inwardly projecting retaining lug 16 for the wedge D.

The friction shoes C are three in number and slidingly telescope within the open end of the casing A. Each shoe has a friction surface 17 on its outer side of V-shaped, transverse cross section. The three shoes C—C—C are arranged symmetrically around the central longitudinal axis of the mechanism with the V-shaped friction surface 17 of each shoe engaged with the friction surfaces 13—13 at adjacent ends of two adjacent liners B—B, the two diverging sections of the friction surface 17 of said shoe being respectively engaged with said surfaces 13—13. At the inner side, each shoe has a wedge face 18 of V-shaped, transverse section.

The wedge D is in the form of a block, having three inwardly converging, V-shaped wedge faces 19—19—19, engaged respectively with the V-shaped wedge faces 18—18—18 of the three shoes C—C—C. At the inner end, the wedge D has three radially outwardly projecting stop lugs 119—119—119, which are engageable with the lugs 16—16—16 of the liners B—B—B to limit outward movement of the wedge.

The spring E is in the form of a helical coil arranged within the casing A and having its opposite ends bearing, respectively, on the inner ends of the shoes C—C—C and the transverse wall 10 of the casing. The spring E is held centered by an inwardly projecting boss 20 on the bottom wall 10 of the casing, extending into the lower end of the spring. The boss 20 is in the form of a cylindrical, tubular section welded to the bottom wall 10 of the casing, as indicated at 21.

Referring to Figure 6, the liner illustrated is similar to the liner shown in Figure 4, with the exception that the same is provided with a pair of retaining pins or lugs 114—114 for connecting the liner to the casing. The liner, which is indicated by F, has a rounded surface 112 at its outer side which fits the interior of the casing. On its inner side, it has diverging flat faces 113—113, corresponding to the faces 13—13 of the liner B. At this outer end, the liner F has an inturned retaining lug 116, corresponding to the lug 16 hereinbefore described. The retaining lugs 114—114, which extend from the outer side of the liner F, are laterally spaced and arranged in parallel. As will be understood, the casing walls are provided with suitable openings to receive the lugs 114—114.

I claim:

1. In a friction shock absorbing mechanism, the combination with a tubular casing open at one end; of a plurality of liners within said open end of the casing arranged symmetrically about the central longitudinal axis of said casing, each of said liners having a pair of friction surfaces on the inner side thereof, said friction surfaces being at opposite sides of the longitudinal central portion of said liner and diverging outwardly with respect to each other; means for securing said liners to the casing wall, comprising a projecting pin on each of said liners engaged in an opening provided in the side wall of the casing; an inturned retaining lug at the outer end of each liner, said lug being aligned with said longitudinal central portion of said liner; friction shoes telescoped within said casing in sliding engagement with said liners, each shoe having a pair of friction surfaces on the outer side thereof, said friction surfaces being at opposite sides of the longitudinal central portion of said shoe, one of said friction surfaces of said shoe being engaged with one of the friction surfaces of one of said liners, and the other of said friction surfaces of said shoe being engaged with the adjacent friction surface of the liner which is adjacent to the said one of said liners; a wedge engaging said shoes; readily outwardly projecting retaining lugs on said wedge extending between adjacent shoes and engaged in back of the lugs of said liners; and spring means within the casing reacting between said casing and shoes for yieldingly opposing inward movement of said shoes.

2. In a friction shock absorbing mechanism, the combination with a tubular casing of cylindrical, interior cross section open at one end; of three liners within the open end of said casing, said liners having curved outer side faces fitting the curved interior side wall of said casing, said liners being arranged symmetrically about the central longitudinal axis of the casing and fixed to the casing wall, each liner presenting a pair of lengthwise extending, laterally diverging friction surfaces, said surfaces of said liners collectively presenting a surface arrangement of hexagonal, transverse cross section; three friction shoes telescoped within the casing in sliding engagement with said liners, each shoe laterally overlapping two adjacent liners; a central retaining lug on each liner at the outer end thereof; a wedge engaging said shoes; stop lugs on said wedge extending between adjacent shoes and engaged in back of the lugs of the liners; spring means within the casing reacting between said casing and shoes for yieldingly opposing inward movement of said shoes.

ARNOLD E. DENTLER.

REFERENCES CITED

The following references are of record in the file of this patent:

UNITED STATES PATENTS

| Number | Name | Date |
| --- | --- | --- |
| 869,269 | Simpson | Oct. 29, 1907 |
| 981,790 | O'Connor | Jan. 17, 1911 |
| 2,159,457 | Sproul | May 23, 1939 |
| 2,238,083 | Sproul | Apr. 15, 1941 |
| 2,357,611 | Shields | Sept. 5, 1944 |
| 2,540,561 | Williams | Feb. 6, 1951 |